United States Patent
Oda et al.

(10) Patent No.: US 8,954,569 B2
(45) Date of Patent: Feb. 10, 2015

(54) GATEWAY, CONTROL METHOD THEREOF, APPLICATION SERVER, AND CONTROL METHOD THEREOF

(75) Inventors: Toshikane Oda, Tokyo (JP); Johan Hjelm, Kanagawa (JP); Takeshi Matsumura, Yokohama (JP); Shingo Murakami, Yokohama (JP); Kenta Yasukawa, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 251 days.

(21) Appl. No.: 13/258,761

(22) PCT Filed: Apr. 20, 2009

(86) PCT No.: PCT/JP2009/058217
§ 371 (c)(1),
(2), (4) Date: Sep. 22, 2011

(87) PCT Pub. No.: WO2010/122670
PCT Pub. Date: Oct. 28, 2010

(65) Prior Publication Data
US 2012/0016987 A1 Jan. 19, 2012

(51) Int. Cl.
*G06F 15/173* (2006.01)
*H04L 12/46* (2006.01)

(52) U.S. Cl.
CPC ................ *H04L 12/4625* (2013.01)
USPC ........................................ 709/224

(58) Field of Classification Search
USPC ............................... 709/220–224
See application file for complete search history.

(56) References Cited

U.S. PATENT DOCUMENTS

| | | | | |
|---|---|---|---|---|
| 7,453,815 | B1 * | 11/2008 | Grabelsky et al. | 370/241 |
| 8,055,735 | B2 * | 11/2011 | Krishnappa et al. | 709/220 |
| 8,200,789 | B2 * | 6/2012 | Boutboul et al. | 709/220 |
| 2003/0204509 | A1 | 10/2003 | Dinker et al. | |

FOREIGN PATENT DOCUMENTS

| | | |
|---|---|---|
| EP | 0 204 959 A1 | 12/1986 |
| EP | 1 874 005 A1 | 1/2008 |
| JP | 10-200583 | 7/1998 |

OTHER PUBLICATIONS

Written Opinion of the International Searching Authority issued for International Application No. PCT/JP2009/058217 on Jun. 16, 2009.
International Search Report issued for International Application No. PCT/JP2009/058217 on Jun. 16, 2009.
Hoebeke, J. et al., "Personal Networks: From concept to a demonstrator", Mobile & Wireless Communication Summit, Jun. 4, 2006, pp. 1-5, XP002431499.
Supplementary European Search Report Corresponding to European Application No. EP 09843668; Dated: Sep. 26, 2014; 12 Pages.

* cited by examiner

*Primary Examiner* — Vivek Srivastava
*Assistant Examiner* — Karina J Garcia-Ching
(74) *Attorney, Agent, or Firm* — Myers Bigel Sibley & Sajovec, PA

(57) ABSTRACT

The present invention generally relates to a gateway, a method for controlling the gateway, an application server, and a method for controlling the application server. The present invention particularly relates, but is not limited to, a technology that facilitates the formation of a single network from a plurality of local networks.

16 Claims, 12 Drawing Sheets

FIG. 2

| IG name | IMPUs of IG | State of IG | Time when IG moved to the current state |
|---------|-------------|-------------|------------------------------------------|
| IG1 | ig1@ims1.net | Active | 2008/05/20,20:15:25 |
| IG2 | ig2@ims2.net,ig2-family@ims2.net | Active | 2008/05/20,20:21:06 |
| IG3 | ig3@ims3.net | Active | 2008/05/20,20:23:19 |
| IG4 | ig4@ims4.net | Inactive | 2008/08/29,04:03:47 |
| ... | ... | ... | ... |

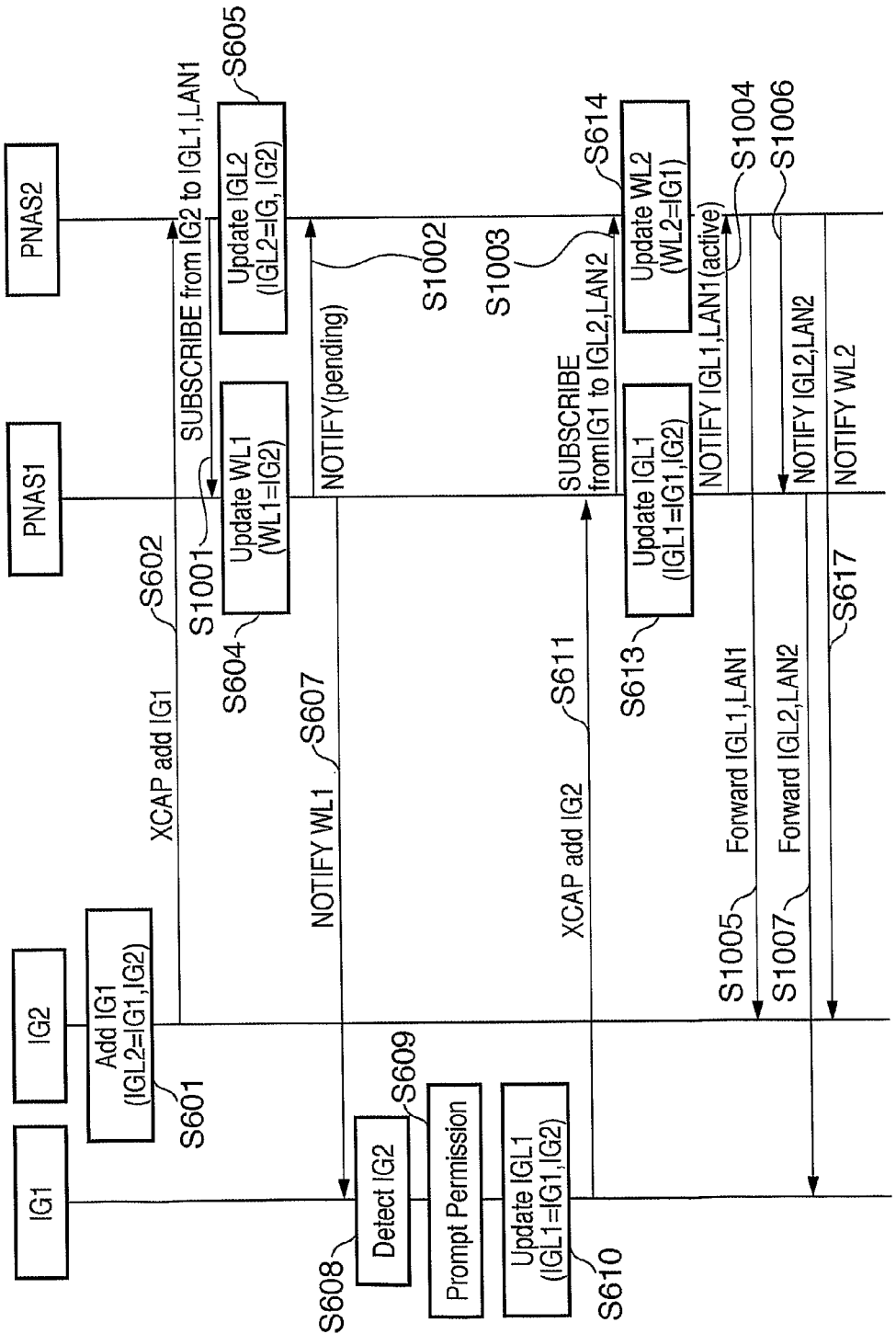

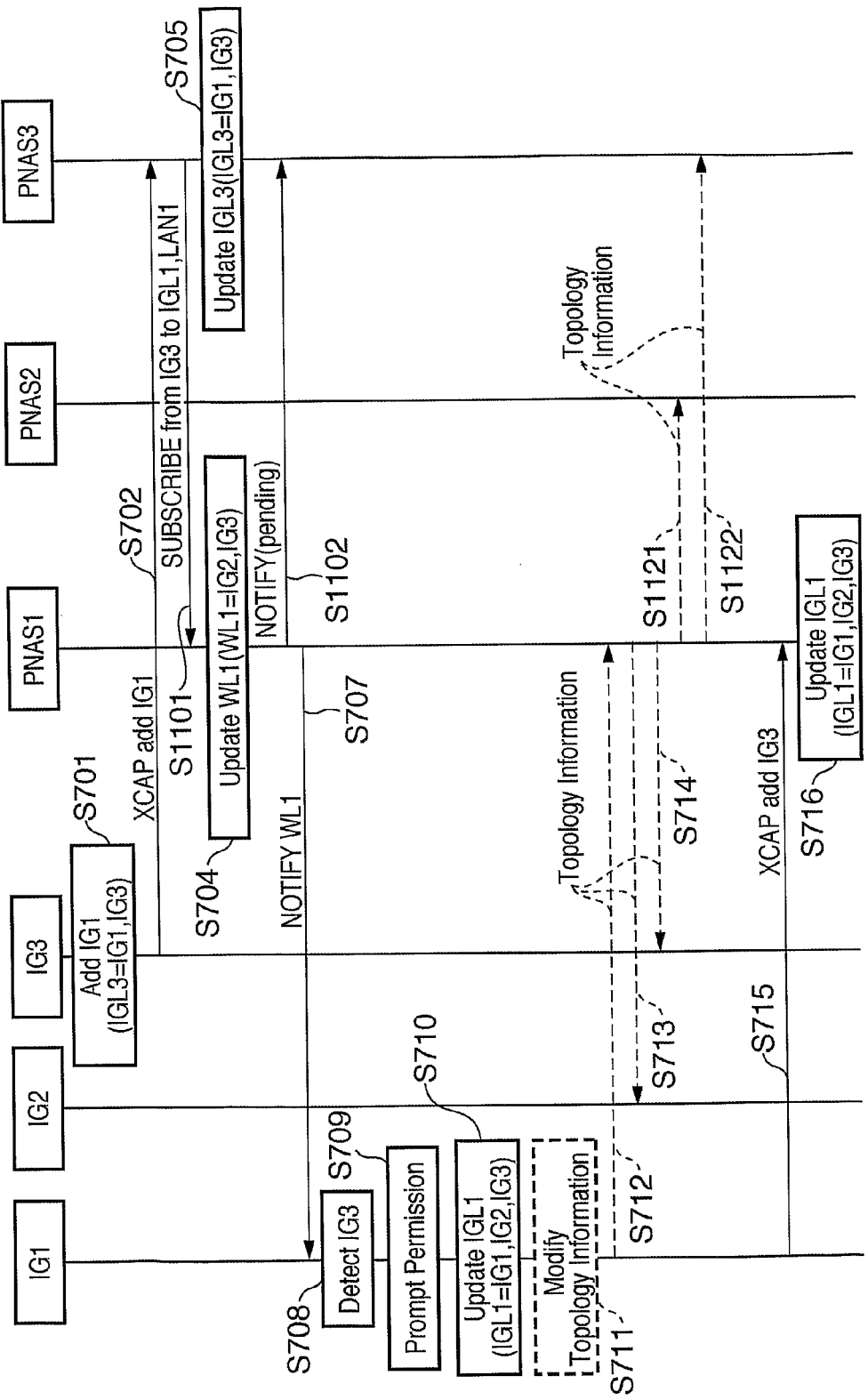

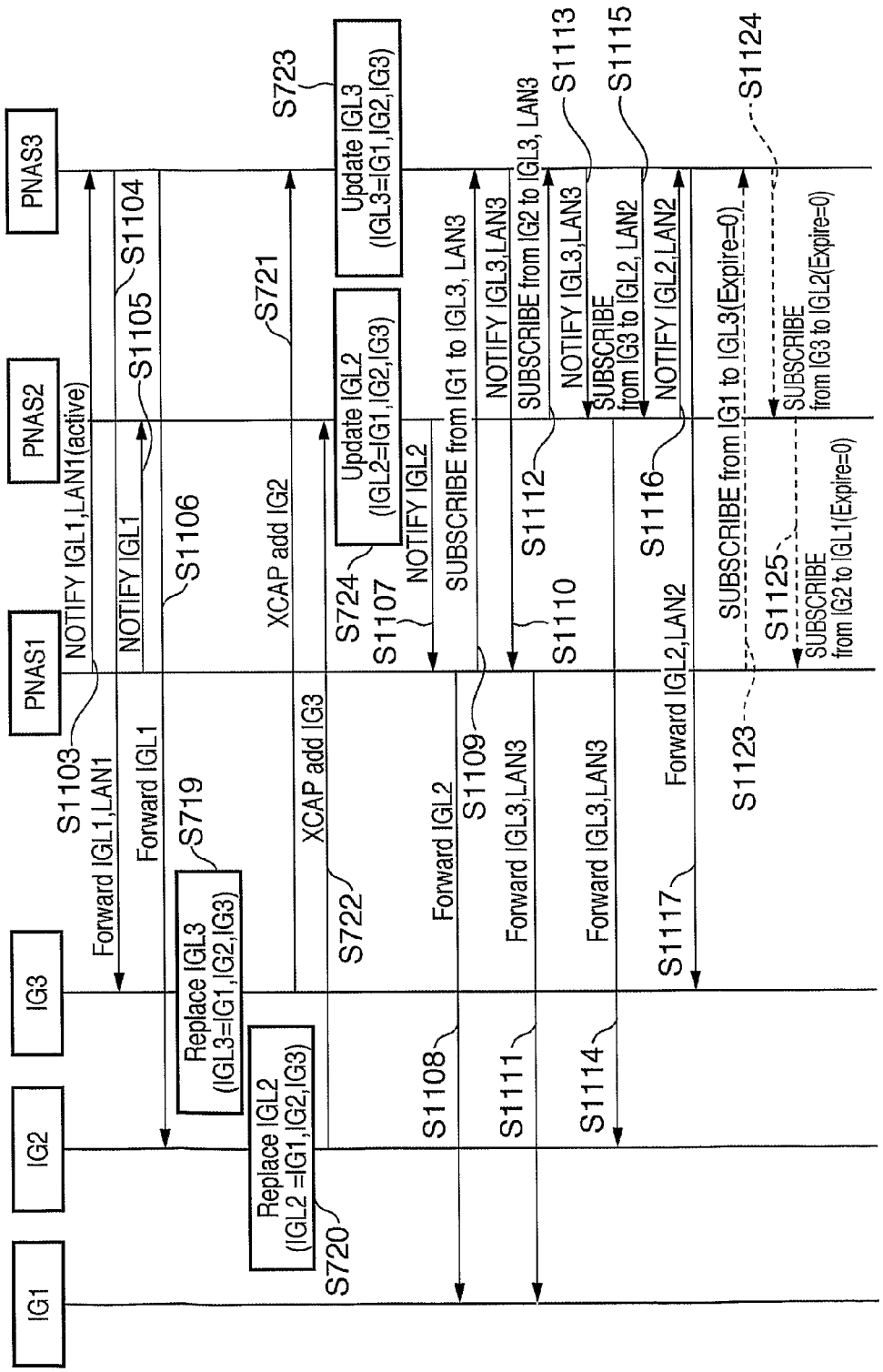

GATEWAY, CONTROL METHOD THEREOF, APPLICATION SERVER, AND CONTROL METHOD THEREOF

CROSS REFERENCE TO RELATED APPLICATION

This application is a 35 U.S.C. §371 national stage application of PCT International Application No. PCT/JP2009/058217, filed on Apr. 20, 2009, which was published in the English language as International Publication No. WO 2010/122670 A1 on Oct. 28, 2010. The disclosure of the above referenced application is hereby incorporated herein in its entirety by reference.

TECHNICAL FIELD

The present invention generally relates to a gateway, a method for controlling the gateway, an application server, and a method for controlling the application server. The present invention particularly relates, but is not limited to, a technology that facilitates the formation of a single network from a plurality of local networks.

BACKGROUND

Currently, a gateway device called an IP Multimedia Subsystem (IMS) Gateway (IG) is known. The IG contains the necessary IMS subscription information (e.g., an IMS Subscriber Identity Module (ISIM) containing an IMS Private User Identity (IMPI) and one or more IMS Public User Identities (IMPUs)) to access an IMS network. The IG also works as a residential gateway to connect a local area network (LAN) to a wide area network (WAN) such as the Internet. A basic configuration of an IG is proposed in, for example, WO 2006/045706.

In the near future, it will be common that a single user or a party (e.g., a company) possesses a plurality of IGs, each of which involves a separate LAN. For example, a user may have the first IG in his/her house and forms the first LAN including the first IG and home devices such as a desktop computer. The user may also have the second IG in his/her car and forms the second LAN including the second IG and mobile devices such as a notebook computer.

In this situation, it is desirable to treat these two LANs as a single personal network (PN). The Converged Personal Network Server (CPNS) proposed by the Open Mobile Alliance (OMA) partly addresses this desire (for details regarding the CPNS, see OMA CPNS WID proposal slides, August 2008). According to the mechanism proposed by the OMA, each IG gathers information regarding its LAN and publishes the information to the CPNS. It is thereby possible for the user to know, through the CPNS, the information (LAN information) about the first and second LANs that form the PN.

However, this mechanism does not work in the desired manner if the first and second IGs belong to different IMS networks (which may be operated by different IMS operators). In this case, the first IG publishes its LAN information to the first CPNS located in the first IMS network, while the second IG publishes its LAN information to the second CPNS located in the second network. However, there is no mechanism to associate the LAN information managed by the first and second CPNSs with each other.

Accordingly, it is either quite difficult or impossible for a device (either in the first or second LAN or external to them) to recognize that the first and second LANs form a single PN and collect the information regarding the PN. In other words, in the conventional art, if respective LANs that should be included in a PN belong to different IMS networks, it is either quite difficult or impossible to make them form a single group in a recognizable manner. If a plurality of LANs are not recognized as a single group, it is not easy for them to cooperate with each other.

SUMMARY

The present invention is intended to address the above-described problem, and it is a feature thereof to introduce a technology that facilitates the formation of a single network from a plurality of local networks.

According to a first aspect of the present invention, there is provided a gateway that retrieves a user identity and connects a local network to a service provider network associated with the user identity, the gateway comprising:

a maintaining unit that maintains gateway information representing a group of gateways that include the gateway and other gateways that retrieve other user identities and connect other local networks to other service provider networks associated with the other user identities;

a subscribing unit that subscribes to other gateway information maintained by the other gateways, and subscribes to subscriber information maintained by an application server in the service provider network, wherein the subscriber information represents gateways that are subscribing to the gateway information;

a receiving unit that receives the other gateway information to which the subscribing unit is subscribing, and receives the subscriber information to which the subscribing unit is subscribing;

a detecting unit that detects, in the received subscriber information, a new gateway that is not included in the group, and modifies the gateway information such that the new gateway is included in the group;

a replacing unit that replaces content of the gateway information with content of the other gateway information received by the receiving unit; and an informing unit that informs the application server of change in the gateway information.

According to a second aspect of the present invention, there is provided a method for controlling a gateway that retrieves a user identity and connects a local network to a service provider network associated with the user identity, the method comprising steps of:

creating gateway information representing a group of gateways, wherein the group represented by the created gateway information only includes the gateway;

informing an application server in the service provider network of addition of the gateway to the group;

subscribing to subscriber information maintained by the application server, wherein the subscriber information represents gateways that are subscribing to the gateway information;

modifying the gateway information such that a second gateway, which retrieves a second user identity and connects a second local network to a second service provider network associated with the second user identity, is included in the group;

informing the application server of addition of the second gateway to the group;

subscribing to second gateway information maintained by the second gateway;

receiving the second gateway information, which represents a group of gateways including a third gateway that retrieves a third user identity and connects a third local network to a third service provider network associated with the third user identity;

replacing content of the gateway information with content of the second gateway information;

informing the application server of change in the gateway information resulting from the replacement; and subscribing to third gateway information maintained by the third gateway.

According to a third aspect of the present invention, there is provided an application server capable of operating in a service provider network associated with a user identity that is retrieved by a gateway connecting a local network to the service provider network, wherein the gateway maintains gateway information representing a group of gateways that include the gateway and other gateways that retrieve other user identities and connect other local networks to other service provider networks associated with the other user identities, the application server comprising:

a maintaining unit that maintains the gateway information by receiving notification of change in the gateway information;

an accepting unit that accepts, from other application servers in the other service provider networks, subscriptions to the gateway information by use of the other user identities, and accepts, from the gateway, a subscription to subscriber information representing gateways whose user identities are used for subscribing to the gateway information;

a notifying unit that notifies the other application servers that are subscribing to the gateway information of the gateway information, and notifies the gateway that is subscribing to the subscriber information of the subscriber information;

a subscribing unit that subscribes, by use of the user identity, to other gateway information maintained by the other gateways;

a receiving unit that receives the other gateway information to which the subscribing unit is subscribing; and a forwarding unit that forwards the other gateway information received by the receiving unit to the gateway.

According to a fourth aspect of the present invention, there is provided a method for controlling an application server capable of operating in a service provider network associated with a user identity that is retrieved by a gateway connecting a local network to the service provider network, the method comprising steps of:

receiving notification of addition of the gateway;

creating gateway information representing a group of gateways, wherein the group represented by the created gateway information only includes the gateway;

receiving notification of addition of a second gateway, which retrieves second user identity and connects a second local network to a second service provider network associated with the second user identity, to the group;

modifying the gateway information such that the second gateway is included in the group;

subscribing, by use of the user identity, to second gateway information maintained by the second gateway;

receiving the second gateway information, which represents a group of gateways including a third gateway that retrieves a third user identity and connects a third local network to a third service provider network associated with the third user identity;

forwarding the second gateway information to the gateway;

receiving notification of addition of the third gateway to the group;

modifying the gateway information such that the third gateway is included in the group;

accepting, from a second application server in the second service provider network, a subscription to the gateway information by use of the second user identity;

notifying the second application server that is subscribing to the gateway information of the gateway information;

accepting, from a third application server in the third service provider network, a subscription to the gateway information by use of the third user identity;

notifying the third application server that is subscribing to the gateway information of the gateway information, subscribing, by use of the user identity, to third gateway information maintained by the third gateway;

receiving the third gateway information; and forwarding the third gateway information to the gateway.

The main advantage of the present invention is that a single network is formed from a plurality of local networks with reduced workload for the user.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 2 shows an IMS gateway (IG) list (IGL) according to an exemplary embodiment of the present invention;

FIG. 10 is a sequence diagram illustrating a procedure whereby a PN including two IGs is formed according to an alternative embodiment of the present invention; and FIGS. 11 and 12 are sequence diagrams illustrating a procedure whereby a further IG is added to the existing PN according to the alternative embodiment of the present invention.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by the claims, and is not limited by each embodiment described below. In addition, not all combinations of the features described in the embodiments are always indispensable for the present invention.

Figure 1:
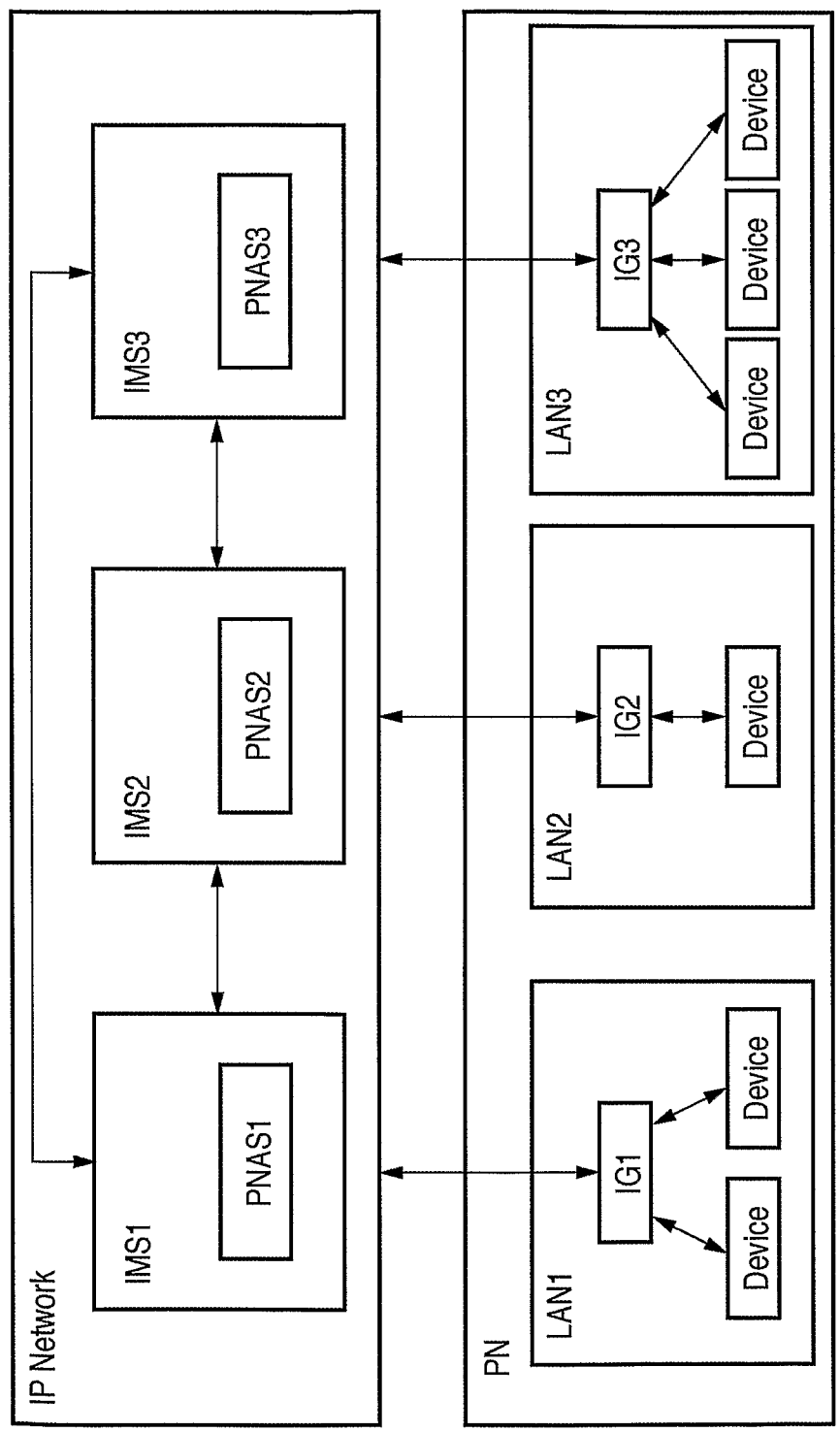
FIG. 1 is a schematic diagram illustrating an overview of the present invention.

FIG. 1 is a schematic diagram illustrating an overview of the present invention. There are three LANs (LAN1, LAN2, LAN3), and each LAN comprises at least one IG (IG1, IG2, IG3). Each LAN may also comprise one or more devices such as a personal computer. Because the IGs function as a residential gateway, each LAN can communicate with the IP network (WAN). There are three IMS networks (IMS1, IMS2, IMS3) in the IP network, and they can communicate with each other. Each IMS network comprises an application server (PNAS1, PNAS2, PNAS3), which is called Personal Network Application Server (PNAS) in the Specification.

It is assumed that IG1, IG2, and IG3 have IMS subscription information associated with IMS1, IMS2, and IMS3, respectively. The IMS subscription information includes an IMPU with which the IG can be served by the IMS and PNAS. It should be noted, for example, that although IG1 does not have an IMPU for PNAS2, it can receive the services of PNAS2 that do not require the IMS subscription to IMS2.

In FIG. 1, it is assumed that LAN1, LAN2, and LAN3 form a single PN. However, it is not possible to form the single PN from the three LANs in the conventional art because there is no appropriate mechanism to associate the LANs with each other. Therefore, the present invention introduces a concept of an IG list (IGL) that represents a group of IGs. Because the IGL is shared by all IGs in the PN and all PNASs associated with the IGs in accordance with a mechanism to be described later, every IG and PNAS can recognize the structure of the PN.

FIG. 2 shows an IGL according to an exemplary embodiment of the present invention. The IGL includes, for respective IGs in the PN, the name of the IG (IG name), the IMPUs of the IG, the state of the IG (active or inactive), and a time stamp indicating the time at which the IG entered its current state.

An "inactive" IG is one which has previously joined the PN but temporarily leaves the PN because it has been shut down, it is failed, or the like. If the IG decides to leave the PN "permanently", the line for this IG is removed from the IGL.

Figure 3:
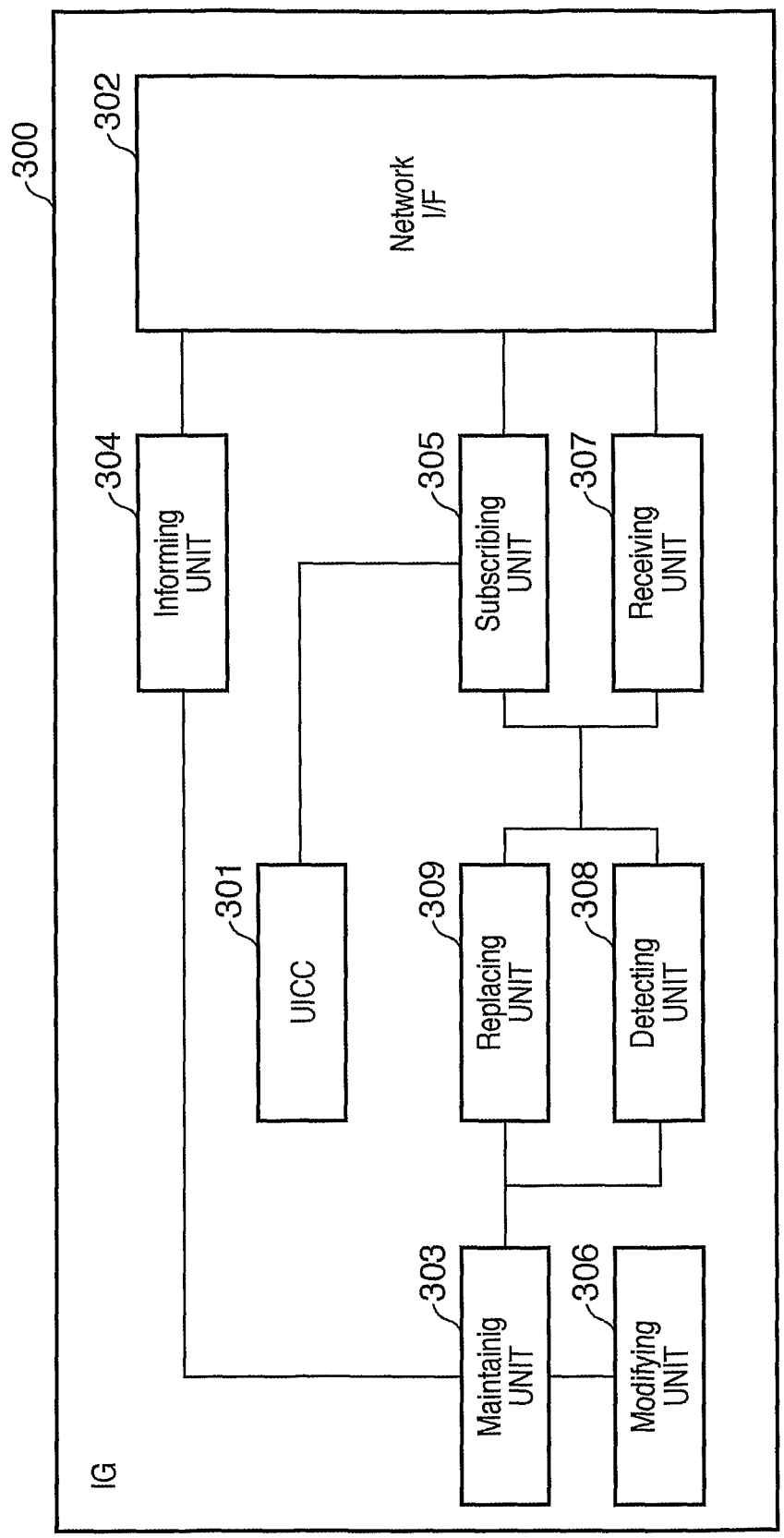
FIG. 3 is a functional block diagram of an IG according to the exemplary embodiment of the present invention.

FIG. 3 is a functional block diagram of an IG 300 according to the exemplary embodiment of the present invention. It should be noted that the functionality of each block in the IG 300 may be implemented using dedicated hardware, using software executed by a processor (not shown) or a combination thereof.

The IG 300 comprises a Universal Integrated Circuit Card (UICC) 301, which is removable from the IG 300. The UICC 301 stores IMS subscription information for an IMS network. The IG 300 retrieves the IMS subscription information from the UICC 301, and connects a LAN to the IMS network associated with the IMS subscription information. The IG 300 also comprises a network interface 302 for communicating with the WAN (such as the IP network shown in FIG. 1). Moreover, although not shown in FIG. 3, the IG 300 comprises a network interface for communicating with the LAN. The operations of the other blocks in the IG 300 will be described later with reference to the sequence diagrams of FIGS. 5-8 and 10.

Figure 4:
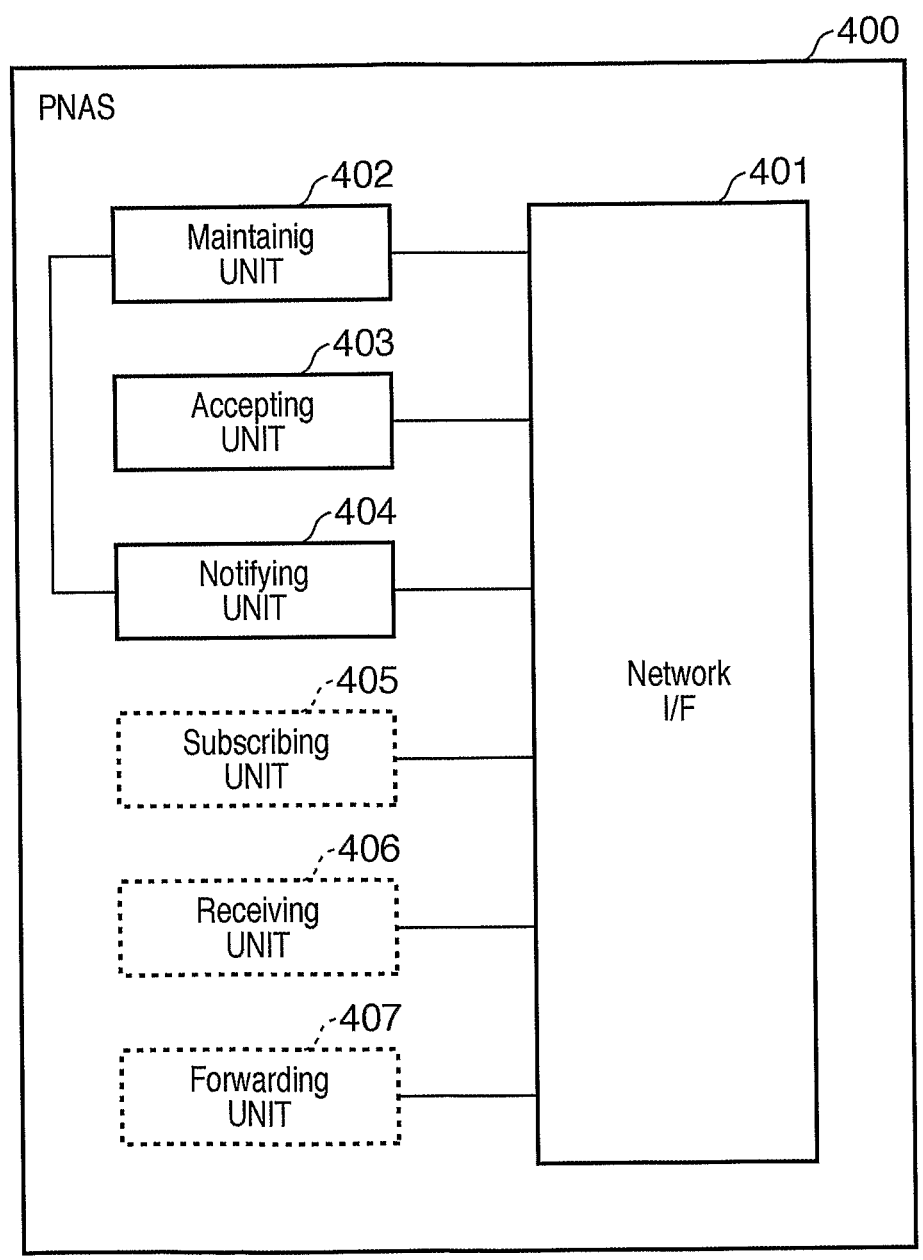
FIG. 4 is a functional block diagram of a Personal Network Application Server (PNAS) according to the exemplary embodiment of the present invention.

FIG. 4 is a functional block diagram of a PNAS 400 according to the exemplary embodiment of the present invention. It should be noted that the functionality of each block in the PNAS 400 may be implemented using dedicated hardware, using software executed by a processor (not shown) or a combination thereof. Blocks surrounded by a broken line are not necessary for the exemplary embodiment.

The PNAS 400 comprises a network interface 401 for communicating with the WAN (such as the IP network shown in FIG. 1). Accordingly, the PNAS 400 can communicate with any nodes including the IG 300 that can communicate with the WAN by way of the network interface 401. It should be noted that the communications between the PNASs belonging to different IMS networks are performed by re-using the existing standard subscription and notification mechanism whose inter-carrier inter-working has been standardized in the OMA (OMA, Presence SIMPLE Architecture, Approved Version 1.1, OMA-AD-Presence_SIMPLE-V1_1-20080627-A, June 2008).

The operations of the other blocks in the PNAS 400 will be described later with reference to sequence diagrams of FIGS. 5-8, and 10.

In the following description, each IG (IG1, IG2, IG3, . . . ) has the configuration of the IG 300 shown in FIG. 3, and each PNAS (PNAS1, PNAS2, PNAS3, . . . ) has the configuration of the PNAS 400 shown in FIG. 4. Moreover, IGLx (x=1,2,3, . . . ) indicates the IGL maintained by the maintaining unit 303 of IGx or the maintaining unit 402 of PNASx, and LANx indicates information regarding the LAN comprising IGx. The watcher list (WL) indicates subscriber information representing IGs that are subscribing to an IGL. WLx is maintained by the maintaining unit 402 of PNASx and represents IGs that are subscribing to IGLx.

Figure 5:
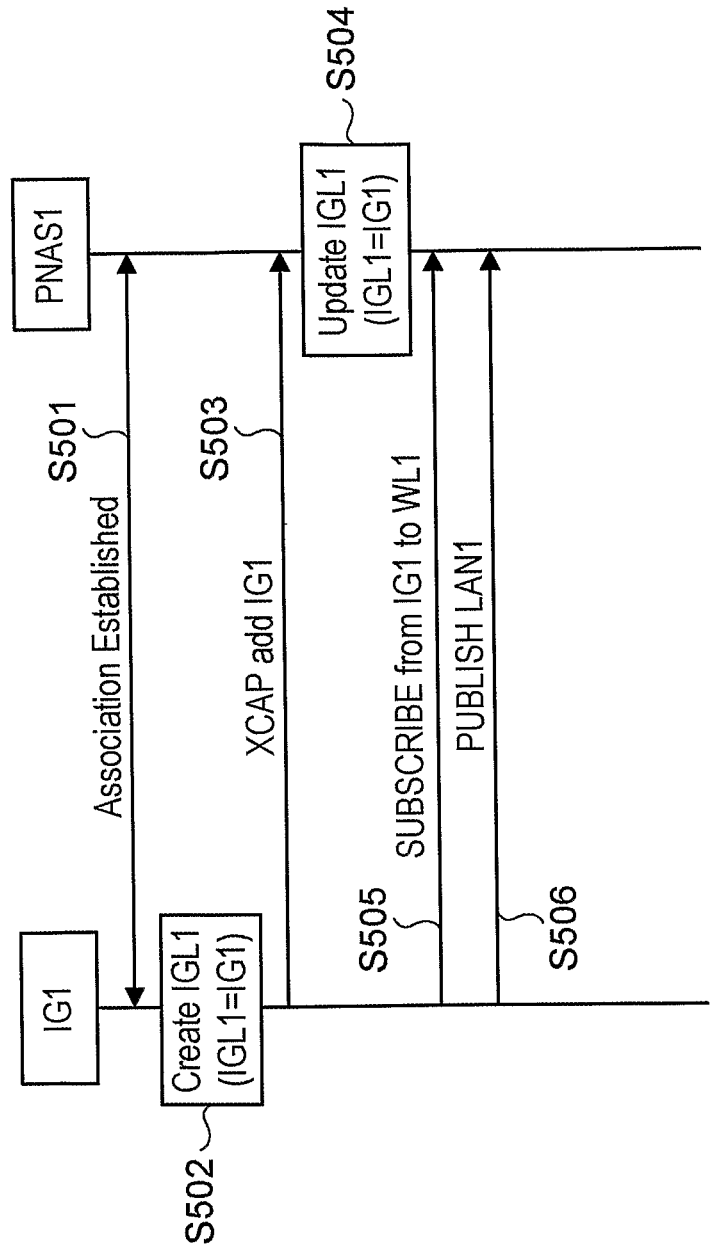
FIG. 5 is a sequence diagram illustrating an initialization procedure of an IG according to the exemplary embodiment of the present invention.

FIG. 5 is a sequence diagram illustrating an initialization procedure of an IG according to the exemplary embodiment of the present invention. For the sake of simplicity, operations that are not necessary to describe the present embodiment are omitted in the following sequence diagrams (for example, a SIP 200 OK message responsive to a SIP SUBSCRIBE message is omitted). It should be noted that the present invention is not limited to protocols described below. For example, some of the SIP messages described below may be replaced by HTTP messages.

Although the initialization procedure is described in terms of IG1, it can be applied to any of IGx. The initialization procedure starts when IG1 is powered on and instructed to establish the association with PNAS1.

In step S501, IG1 establishes an association with PNAS1. This step includes several procedures in accordance with the conventional art. For example, IG1 retrieves the IMS subscription information including IMPU(s) and an IMPI from the UICC 301 and attaches the IMS network (IMS1) associated with the IMS subscription information.

In step S502, the maintaining unit 303 creates IGL1, which, at that point, only includes information regarding IG1.

In step S503, the informing unit 304 informs PNAS1 of the change in IGL1, by using, for example, the XML Configuration Access Protocol (XCAP) via Ut interface or a SIP PUBLISH message.

In step S504, the maintaining unit 402 of PNAS1 updates IGL1 such that it includes information regarding IG1.

In step S505, the subscribing unit 305 of IG1 subscribes to WL1 by sending a SIP SUBSCRIBE message to PNAS1. The SIP SUBSCRIBE message is accepted by the accepting unit 403 of PNAS1.

In step S506, the informing unit 304 of IG1 publishes LAN1 to PNAS1 by sending a SIP PUBLISH message to PNAS1.

At this stage, IG1 and PNAS1 share the IGL1 and LAN1. Similarly, IGx and PNASx share the IGLx and LANx. However, the association between the IGs has not yet been established because each IGL only includes a single IG; therefore, a PN including more than one LAN has not yet been formed.

It should be noted that the publication of the LAN information (LAN1) in step S506 is not essential to the present invention. As long as the IGL that includes all IGs of the PN is shared by all the IGs, each IG can recognize the existence of the other IGs in the PN. With the IGL, each IG can obtain any information from the PNASs serving the other IGs, as long as the information is published by the other IGs thereto. In other words, each IG can share, with the other IGs, the information regarding all the LANs forming the PN.

Although the present embodiment is described in the context of the LAN information, specific procedures may vary depending upon the nature of the information to be shared.

Figure 6:
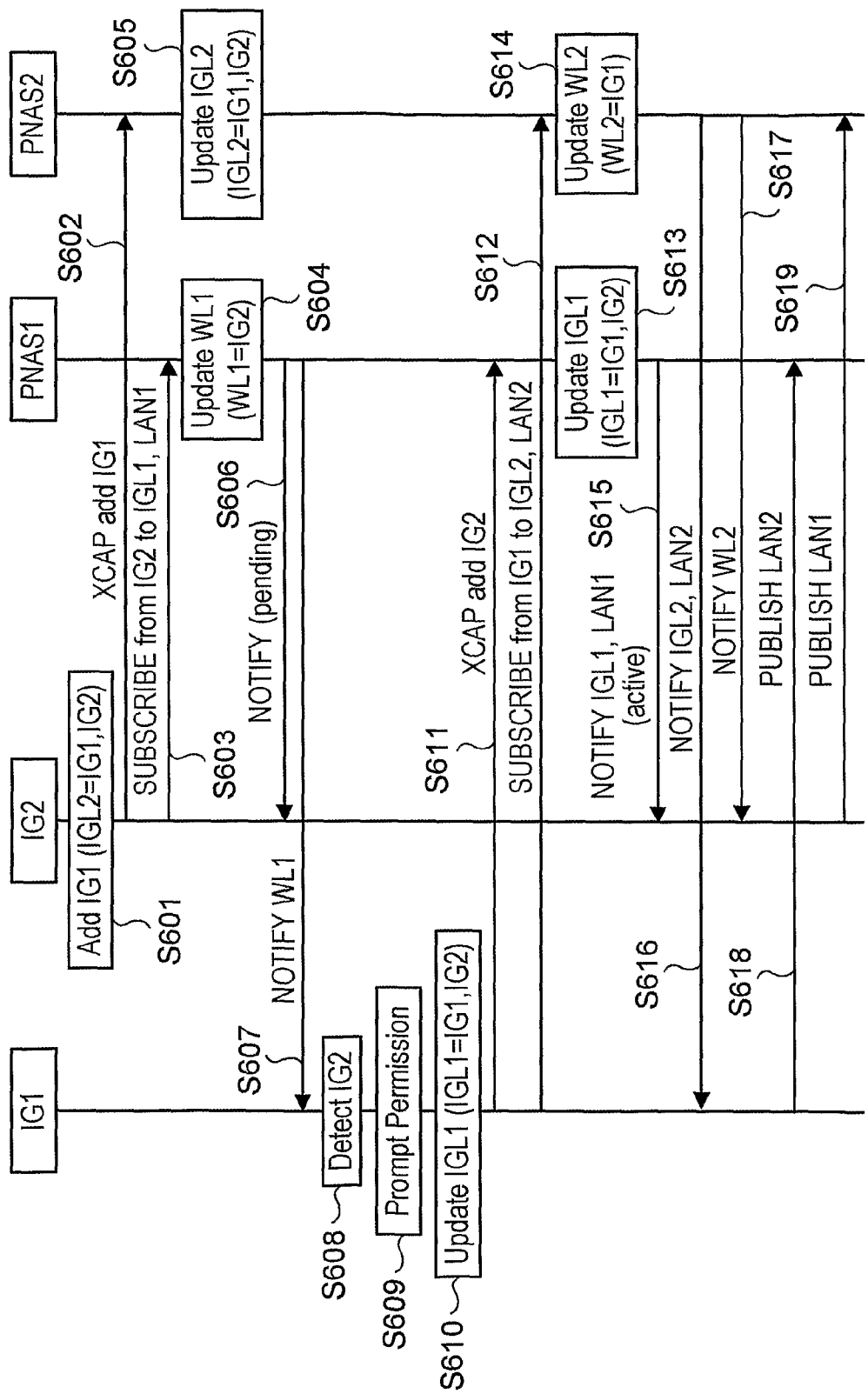
FIG. 6 is a sequence diagram illustrating a procedure whereby a personal network (PN) including two IGs is formed according to the exemplary embodiment of the present invention.

FIG. 6 is a sequence diagram illustrating a procedure whereby a PN including two IGs is formed according to the exemplary embodiment of the present invention. It is assumed that the initialization procedure of FIG. 5 has been completed for the respective IGs.

In step S601, the modifying unit 306 of IG2 receives an instruction to add IG1 from a user, and in response to the instruction, modifies IGL2 such that IG1 is included in IGL2. As a result, IGL2 of IG2 then includes IG1 and IG2.

In step S602, the informing unit 304 of IG2 informs PNAS2 of the change (i.e., the addition of IG1) in IGL2 by use of an XCAP command.

In step S603, the subscribing unit 305 of IG2 subscribes to IGL1 and LAN1 by sending a SIP SUBSCRIBE message to PNAS1. To be more specific, the SIP SUBSCRIBE message is addressed to IG1, but a Call Session Control Function (CSCF) of IMS1 intercepts the message and routes it to PNAS1. The SIP SUBSCRIBE message is accepted by the accepting unit 403 of PNAS1. It should be noted that the latest presence information of IG1 (i.e., IGL1 and LAN1) that has been sent from IG1 to PNAS1, is maintained by the maintaining unit 402 of PNAS1.

In step S604, the maintaining unit 402 of PNAS1 updates WL1 because a new subscription is made in step S603. As a result, WL1 includes IG2.

In step S605, in response to the XCAP command in step S602, the maintaining unit 402 of PNAS2 updates IGL2 such that it includes IG1. As a result, IGL2 of PNAS2 includes IG1 and IG2.

Figure 9:
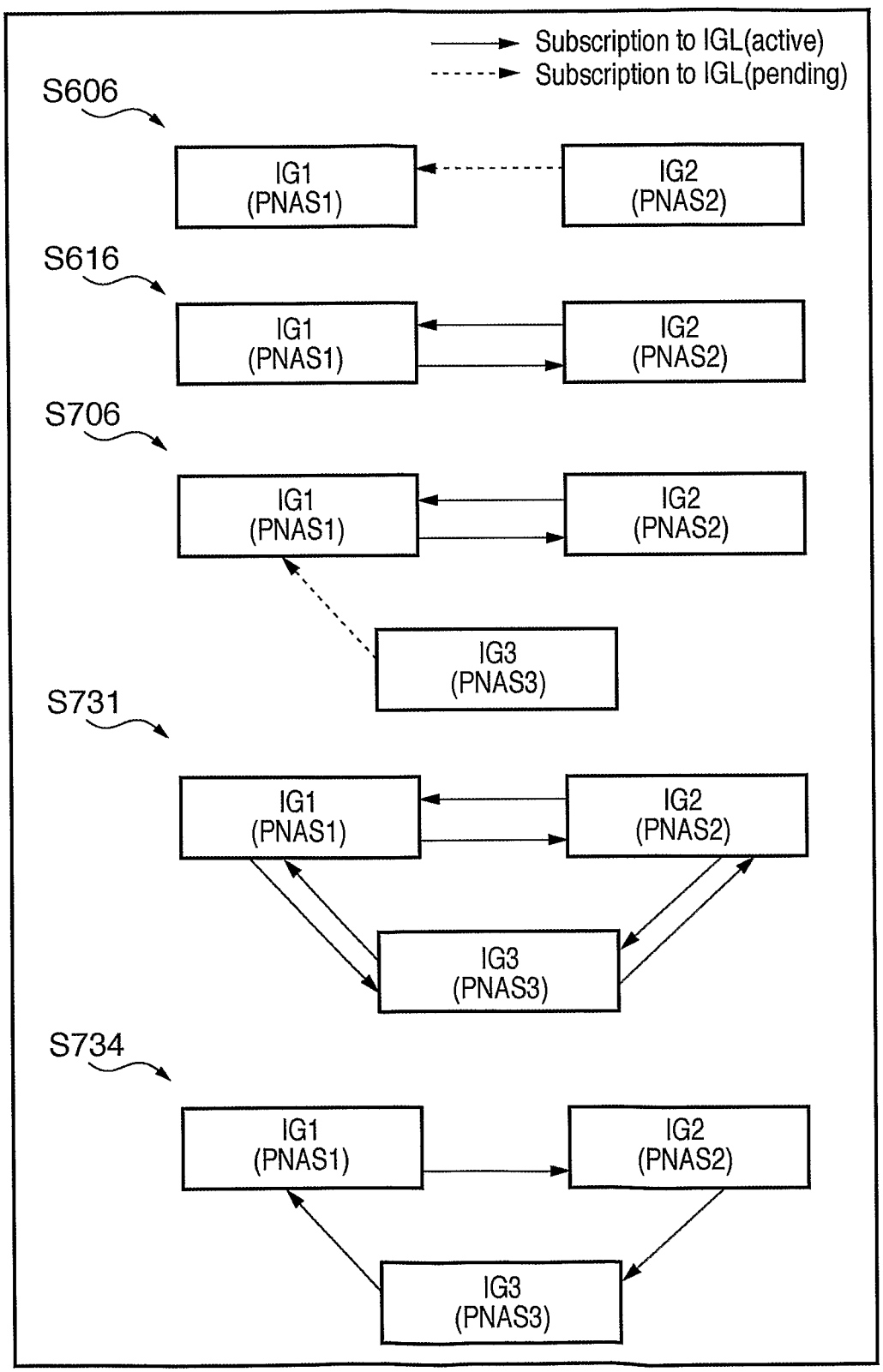
FIG. 9 schematically illustrates examples of the topology of the subscription to the IGL between IGs.

In step S606, in response to the subscription in step S603, the notifying unit 404 of PNAS1 sends a SIP NOTIFY message to IG2. However, the SIP NOTIFY message does not include IGL1 and LAN1, and its "Subscription-state" parameter is set to "pending". At this stage, the subscription of IG2 to IGL1 of IG1 is formed as shown in FIG. 9, although it is in a pending state.

In step S607, the notifying unit 404 of PNAS1 sends a SIP NOTIFY message including WL1 to IG1 because WL1 is updated in step S604. The SIP NOTIFY message is received by the receiving unit 307 of IG1.

In step S608, the detecting unit 308 of IG1 detects a new IG (i.e., IG2) that is not included in IGL1.

In step S609, the detecting unit 308 of IG1 prompts the user to permit or deny the addition of IG2.

In step S610, under the condition that the user permitted the addition of IG2 in step S609, the detecting unit 308 of IG1 modifies IGL1 such that it includes IG2. As a result, IGL1 of IG1 includes IG1 and IG2.

In step S611, the informing unit 304 of IG1 informs PNAS1 of the change (i.e., addition of IG2) in IGL1 by use of an XCAP command.

In step S612, the subscribing unit 305 of IG1 subscribes to IGL2 and LAN2 by sending a SIP SUBSCRIBE message to PNAS2. The SIP SUBSCRIBE message is accepted by the accepting unit 403 of PNAS2.

In step S613, in response to the XCAP command in step S611, the maintaining unit 402 of PNAS1 updates IGL1 such that it includes IG2. As a result, IGL1 of PNAS1 includes IG1 and IG2.

In step S614, the maintaining unit 402 of PNAS2 updates WL2 because a new subscription is made in step S612. As a result, WL2 includes IG1.

In step S615, the notifying unit 404 of PNAS1 sends a SIP NOTIFY message including IGL1 and LAN1 to IG2 because the notifying unit 404 of PNAS1 recognizes, through the XCAP command in step S611, that the addition of IG2 is permitted. In this step, the "Subscription-state" parameter of the SIP NOTIFY message is set to "active". In this step, the replacing unit 309 of IG2 recognizes that the IGL including IG1 and IG2 is shared with IG1 because both IGL2 and the received IGL1 include IG1 and IG2.

In step S616, in response to the subscription in step S612, the notifying unit 404 of PNAS2 sends a SIP NOTIFY message including IGL2 and LAN2 to IG1. Similar to step S615, the replacing unit 309 of IG1 recognizes that the IGL including IG1 and IG2 is shared with IG2 because both IGL1 and the received IGL2 include IG1 and IG2.

At this stage, the bi-directional subscription to the IGL between IG1 and IG2 is formed as shown in FIG. 9. Accordingly, IG1 can notice any change in IGL2 of IG2, and vice versa. Consequently, the PN including IG1 and IG2 is formed in a recognizable manner, and it is possible for IG1 and IG2 to keep track of the latest IGL representing the group of IGs included in the PN.

In step S617, the notifying unit 404 of PNAS2 sends a SIP NOTIFY message including WL2 to IG2 because WL2 is updated in step S614. In this step, the detecting unit 308 of IG2 does not detect a new IG because IG1 in WL2 is already included in IGL2.

In step S618, the informing unit 304 of IG1 publishes LAN2 received in step S616 to PNAS1.

In step S619, the informing unit 304 of IG2 publishes LAN1 received in step S615 to PNAS2.

At this stage, both PNAS1 and PNAS2 have the information regarding all LANs forming the PN. Accordingly, a device that wishes to access the PN may obtain all LAN information of the PN if it accesses PNAS1 or PNAS2 and if the access of the device is permitted. Alternatively, PNAS1 and PNAS2 may expose the IGL to the device instead of the LAN information. In this case, the device may, by inspecting the IGL, identify PNAS1 and PNAS2 serving IG1 and IG2 that are involved in the PN, and gather respective LAN information from PNAS1 and PNAS2. Therefore, it is not necessary for PNASs to gather all LAN information regarding the PN.

Figure 7:
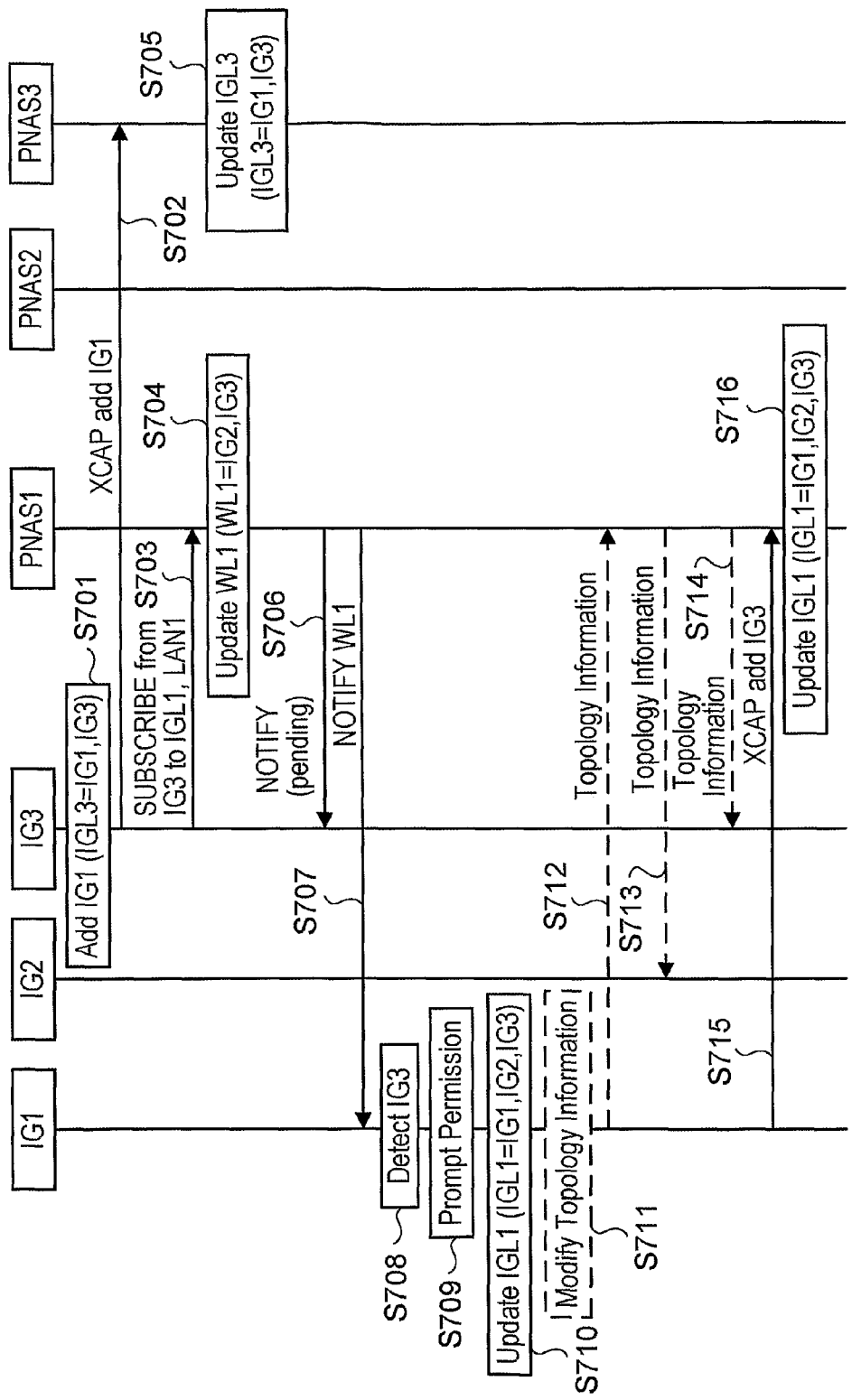
FIGS. 7 and 8 are sequence diagrams illustrating a procedure whereby a further IG is added to the existing PN according to the exemplary embodiment of the present invention.
Figure 8:
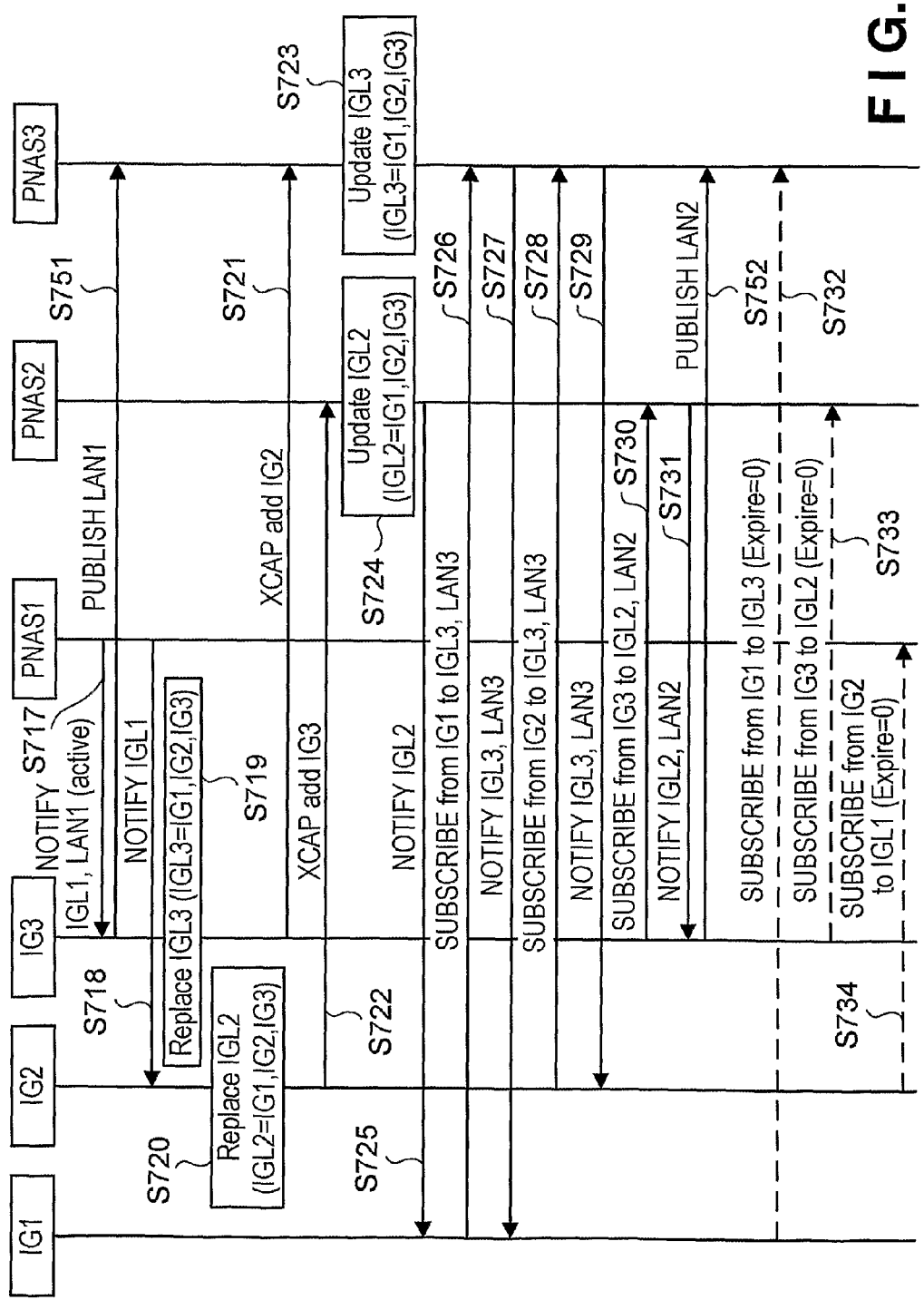

FIGS. 7 and 8 are sequence diagrams illustrating a procedure whereby a further IG is added to the existing PN according to the exemplary embodiment of the present invention. It is assumed that IG3 is added to the PN including IG1 and IG2. For the sake of simplicity, the publication of LAN information is omitted in FIGS. 7 and 8 except steps S751 and S752.

In step S701, the modifying unit 306 of IG3 receives an instruction to add IG1 from the user, and in response to the instruction, modifies IGL3 such that IG1 is included in IGL3. As a result, IGL3 of IG3 includes IG1 and IG3.

In step S702, the informing unit 304 of IG3 informs PNAS3 of the change (i.e., addition of IG1) in IGL3 by use of an XCAP command.

In step S703, the subscribing unit 305 of IG3 subscribes to IGL1 and LAN1 by sending a SIP SUBSCRIBE message to PNAS1. The SIP SUBSCRIBE message is accepted by the accepting unit 403 of PNAS1.

In step S704, the maintaining unit 402 of PNAS1 updates WL1 because a new subscription is made in step S603. As a result, WL1 includes IG2 and IG3.

In step S705, in response to the XCAP command in step S702, the maintaining unit 402 of PNAS3 updates IGL3 such that it includes IG1. IGL3 of PNAS3 includes IG1 and IG3.

In step S706, in response to the subscription in step S703, the notifying unit 404 of PNAS1 sends a SIP NOTIFY message to IG3. However, the SIP NOTIFY message does not include IGL1 and LAN1, and its "Subscription-state" parameter is set to "pending". At this stage, the subscription of IG3 to IGL1 of IG1 is formed as shown in FIG. 9, although it is in a pending state.

In step S707, the notifying unit 404 of PNAS1 sends a SIP NOTIFY message including WL1 to IG1 because WL1 is updated in step S704. The SIP NOTIFY message is received by the receiving unit 307 of IG1.

In step S708, the detecting unit 308 of IG1 detects a new IG (i.e., IG3) that is not included in IGL1.

In step S709, the detecting unit 308 of IG1 prompts the user to permit the addition of IG3.

In step S710, under the condition that the user permitted the addition of IG3 in step S709, the detecting unit 308 of IG1 modifies IGL1 such that it includes IG3. As a result, IGL1 of IG1 includes IG1, IG2, and IG3.

Steps S711-S714 are optional, and will be described later.

In step S715, the informing unit 304 of IG1 informs PNAS1 of the change (i.e., addition of IG3) in IGL1 by use of an XCAP command.

In step S716, in response to the XCAP command in step S715, the maintaining unit 402 of PNAS1 updates IGL1 such that it includes IG3. As a result, the IGL1 of PANS1 includes IG1, IG2, and IG3.

Referring to FIG. 8, in step S717 that follows S716, the notifying unit 404 of PNAS1 sends a SIP NOTIFY message including IGL1 and LAN1 to IG3 because the notifying unit 404 of PNAS1 recognizes, through the XCAP command in step S715, that the addition of IG3 is permitted. In this step, the "Subscription-state" parameter of the SIP NOTIFY message is set to "active". Upon receipt of LAN1, IG3 publishes LAN1 to PNAS3 in step S751.

In step S718, the notifying unit 404 of PNAS1 sends a SIP NOTIFY message including IGL1 to IG2 because IGL1, to which the subscribing unit 305 of IG2 is subscribing, is updated in step S716.

In step S719, the replacing unit 309 of IG3 replaces IGL3 with IGL1 received in step S717. As a result, IGL3 of IG3 includes IG1, IG2, and IG3. In other words, IG2 is added to IGL3 of IG3.

In step S720, the replacing unit 309 of IG2 replaces IGL2 with IGL1 received in step S718. As a result, IGL2 of IG2 includes IG1, IG2, and IG3. In other words, IG3 is added to IGL2 of IG2.

In step S721, because IG2 is added to IGL3 of IG3 in step S719, the informing unit 304 of IG3 informs PNAS3 of the addition of IG2 by use of an XCAP command.

In step S722, because IG3 is added to IGL2 of IG2 in step S720, the informing unit 304 of IG2 informs PNAS2 of the addition of IG3 by use of an XCAP command.

In step S723, in response to the XCAP command in step S721, the maintaining unit 402 of PNAS3 updates IGL3 such that it includes IG2. As a result, IGL3 of PNAS3 includes IG1, IG2, and IG3.

In step S724, in response to the XCAP command in step S722, the maintaining unit 402 of PNAS2 updates IGL2 such that it includes IG3. As a result, IGL2 of PNAS2 includes IG1, IG2, and IG3.

In step S725, the notifying unit 404 of PNAS2 sends a SIP NOTIFY message including IGL2 to IG1 because IGL2 was updated in step S724.

In step S726, the subscribing unit 305 of IG1 detects that it is not subscribing to IGL3 of IG3, which is included in IGL1. Therefore, the subscribing unit 305 of IG1 subscribes to IGL3 and LAN3. IGL3 and LAN3 are received in step S727.

In step S728, the subscribing unit 305 of IG2 detects that it is not subscribing to IGL3 of IG3, which is included in IGL2. Therefore, the subscribing unit 305 of IG2 subscribes to IGL3 and LAN3. IGL3 and LAN3 are received in step S729.

In step S730, the subscribing unit 305 of IG3 detects that it is not subscribing to IGL2 of IG2, which is included in IGL3. Therefore, the subscribing unit 305 of IG3 subscribes to IGL2 and LAN2. IGL2 and LAN2 are received in step S731. Upon receipt of LAN1, IG3 publishes LAN1 to PNAS3 in step S752.

At this stage, the bi-directional subscription to the IGL between IG1 and IG2, IG2 and IG3, and IG3 and IG1 is formed as shown in FIG. 9. Accordingly, the PN including IG1, IG2, and IG3 is formed in a recognizable manner, and it is possible for IG1, IG2, and IG3 to keep track of the latest IGL representing the group of IGs included in the PN.

Addition of further IGs to the existing PN can be performed using a procedure similar to the procedure shown in FIGS. 7 and 8.

In some embodiments, the maintaining unit 303 of the IG 300 may further maintain topology information representing a directed graph between IGs included in the PN. The directed graph is configured such that every IG has a path to every other IG. In this case, the subscribing unit 305 conducts a subscription to the IGL of the other IGs in accordance with the directed graph. In other words, the subscribing unit 305 does not subscribe to the IGL of an IG to which a direct path (i.e., a path that does not traverse another IG) does not exist in the directed graph.

Without the topology information, as described above with reference to step S731 of FIG. 8, the subscription to the IGL between IGs is formed in the "full-mesh" structure. On the other hand, with the topology information, the subscription to the IGL between IGs may be formed in, for example, a "loop" structure. This is advantageous in that communication traffic related to signaling for SIP SUBSCRIBE/NOTIFY can be reduced.

Referring to FIG. 7, in step S711, the detecting unit 308 of IG1 modifies the topology information. Although it is assumed that the modified topology information represents the directed graph with the loop structure (IG1 -> IG2 -> IG3 -> IG1), any structure can be employed as long as every IG including the newly detected IG has a path to every other IG (either directly or indirectly).

In step S712, the detecting unit 308 of IG1 sends the modified topology information to PNAS1.

In steps S713 and S714, the maintaining unit 402 of PNAS1 forwards the received topology information to the other IGs (i.e., IG2 and IG3) in IGL1. In these steps, the replacing unit 309 of IG2 replaces the topology information maintained by the maintaining unit 303 of IG2 with the received topology information, and the replacing unit 309 of IG3 replaces the topology information maintained by the maintaining unit 303 of IG3 with the received topology information.

Referring to FIG. 8, in steps S732-S734, in accordance with the topology information, the IGs terminate some of the subscriptions by sending a SIP SUBSCRIBE whose "Expire" header is set to "0". As a result, the subscription with the loop structure is formed as shown in FIG. 9.

It should be noted that, for example, if, prior to step S726, the subscribing unit 305 of IG1 recognizes that the subscription to IGL3 is not necessary, steps S726, S727, and S732 can be omitted.

In an alternative embodiment, the PNAS 400 subscribes to an IGL on behalf of the IG 300 (3GPP TS 23.228 "IP Multimedia Subsystem (IMS); Stage 2 (Release 8)," section 5.7.3 (Application Server (AS) acting as originating UA), 2008). For this purpose, the PNAS 400 further comprises a subscribing unit 405, a receiving unit 406, and a forwarding unit 407 as shown in FIG. 4.

FIG. 10 is a sequence diagram illustrating a procedure whereby a PN including two IGs is formed according to the alternative embodiment of the present invention. In FIG. 10, steps, in which the operations that are the same or similar to those in FIG. 6 are performed, are assigned the identical reference numeral to steps in FIG. 6, and descriptions thereof will be omitted.

In step S1001, the subscribing unit 405 of PNAS2 subscribes to IGL1 and LAN1 by use of the IMPU of IG2. It should be noted that PNAS2 can obtain the IMPU of IG2 when the association between PNAS2 and IG2 is established (see step S501 of FIG. 5).

In step S1002, in response to the subscription in step S1001, the notifying unit 404 of PNAS1 sends a SIP NOTIFY message to PNAS2. However, the SIP NOTIFY message does not include IGL1 and LAN1, and its "Subscription-state" parameter is set to "pending". The SIP NOTIFY message is received by the receiving unit 406 of PNAS2.

In step S1003, the subscribing unit 405 of PNAS1 subscribes to IGL2 and LAN2 by use of the IMPU of IG2.

In step S1004, the notifying unit 404 of PNAS1 sends a SIP NOTIFY message including IGL1 and LAN1 to PNAS2 because the notifying unit 404 of PNAS1 recognizes, through the XCAP command in step S611, that the addition of IG2 is permitted. In this step, the "Subscription-state" parameter of the SIP NOTIFY message is set to "active". The SIP NOTIFY message is received by the receiving unit 406 of PNAS2.

In step S1005, the forwarding unit 407 of PNAS2 forwards IGL1 and LAN1 to IG2. In this step, the replacing unit 309 of IG2 recognizes that the IGL including IG1 and IG2 is shared with IG1 because both IGL2 and the forwarded IGL1 include IG1 and IG2.

In step S1006, in response to the subscription in step S1003, the notifying unit 404 of PNAS2 sends a SIP NOTIFY message including IGL2 and LAN2 to PNAS1. The SIP NOTIFY message is received by the receiving unit 406 of PNAS1.

In step S1007, the forwarding unit 407 of PNAS1 forwards IGL2 and LAN2 to IG1. Similar to step S1005, the replacing unit 309 of IG1 recognizes that the IGL including IG1 and IG2 is shared with IG2 because both IGL1 and the forwarded IGL2 include IG1 and IG2.

It should be noted that the publication of LAN2 from IG1 to PNAS1 and the publication of LAN1 from IG2 to PNAS2 are not necessary because PNAS1 obtains LAN2 in step S1006 and PNAS2 obtains LAN1 in step S1004.

FIGS. 11 and 12 are sequence diagrams illustrating a procedure whereby a further IG is added to the existing PN according to the alternative embodiment of the present invention. It is assumed that IG3 is added to the PN including IG1 and IG2. In FIGS. 11 and 12, steps, in which the operations that are the same or similar to those in FIGS. 6 and 7 are performed, are assigned the identical reference numeral to steps in FIGS. 6 and 7, and descriptions thereof will be omitted.

In step S1101, the subscribing unit 405 of PNAS3 subscribes to IGL1 and LAN1 by use of the IMPU of IG3. It should be noted that PNAS3 can obtain the IMPU of IG3 when the association between PNAS3 and IG3 is established (see step S501 of FIG. 5).

In step S1102, in response to the subscription in step S1101, the notifying unit 404 of PNAS1 sends a SIP NOTIFY message to PNAS3. However, the SIP NOTIFY message does not include IGL1 and LAN1, and its "Subscription-state" parameter is set to "pending". The SIP NOTIFY message is received by the receiving unit 406 of PNAS3.

In step S1103, the notifying unit 404 of PNAS1 sends a SIP NOTIFY message including IGL1 and LAN1 to PNAS3 because the notifying unit 404 of PNAS1 recognizes, through the XCAP command in step S715, that the addition of IG3 is permitted. In this step, the "Subscription-state" parameter of the SIP NOTIFY message is set to "active". The SIP NOTIFY message is received by the receiving unit 406 of PNAS3.

In step S1104, the forwarding unit 407 of PNAS3 forwards IGL1 and LAN1 to IG3.

In step S1105, the notifying unit 404 of PNAS1 sends a SIP NOTIFY message including IGL1 to PNAS2 because IGL1, to which the subscribing unit 405 of PNAS2 is subscribing, is updated in step S716.

In step S1106, the forwarding unit 407 of PNAS2 forwards IGL1 to IG2.

In step S1107, the notifying unit 404 of PNAS2 sends a SIP NOTIFY message including IGL2 to PNAS1 because IGL2 is updated in step S724.

In step S1108, the forwarding unit 407 of PNAS1 forwards IGL2 to IG1.

In step S1109, the subscribing unit 405 of PNAS1 detects that it is not subscribing to IGL3 of IG3, which is included in IGL1. Therefore, the subscribing unit 405 of PNAS1 subscribes to IGL3 and LAN3. IGL3 and LAN3 are received in step S1110, and forwarded to IG1 in step S1111.

In step S1112, the subscribing unit 405 of PNAS2 detects that it is not subscribing to IGL3 of IG3, which is included in IGL2. Therefore, the subscribing unit 405 of PNAS2 subscribes to IGL3 and LAN3. IGL3 and LAN3 are received in step S1113, and forwarded to IG2 in step S1114.

In step S1115, the subscribing unit 405 of PNAS3 detects that it is not subscribing to IGL2 of IG2, which is included in IGL3. Therefore, the subscribing unit 405 of PNAS3 subscribes to IGL2 and LAN2. IGL2 and LAN2 are received in step S1116, and forwarded to IG3 in step S1117.

It should be noted that if the topology information is forwarded from PNAS1 to PNAS2 and PNAS3 in steps S1121 and S1122, the PNASs may terminate some of the subscriptions by sending a SIP SUBSCRIBE whose "Expire" header is set to "0" in steps S1123-S1125 in accordance with the topology information.

(Variations)

It should be noted that the principle of the present invention described above can also be applied to cases wherein one or more PNASs serve one or more IGs that are involved in different LANs.

Similarly, the principle of the present invention can also be applied to cases wherein a plurality of IGs are included in a single LAN or in a plurality of LANs that are overlapping partially. In such cases, a PNAS may receive the same LAN information from the plurality of LANs. Therefore, the PNAS may conduct a filtering operation whereby the redundant information is eliminated.

Moreover, the principle of the present invention can also be applied to a SIP network that is not necessarily compliant to the IMS standards but is compliant to the IETF SIP standards.

In this case, some adaptation is made. For example, the IG is replaced by a SIP Gateway (SG), and the IMPU is replaced by SIP URI of the SG.

Furthermore, the IG can be replaced by a general SIP User Agent (UA) that has the function of a Presence User Agent (PUA), and the PNAS can be replaced by a general Presence Agent (PA). The LAN information published by the PNAS can be replaced by the presence information originally provided by the SIP UA.

(Advantages of the Present Invention)

According to the present invention, as described above with reference to various embodiments, IGs and PNASs serving the IGs are configured to share the IGL representing the group of IGs that are involved in a PN.

In order to form a new PN, a user needs merely to indicate to his/her IG the IMPU of another IG; because both IGs (and PNASs serving them) automatically update their IGLs such that they include both the IGs, a new PN is formed. Moreover, in order to add an IG to an existing PN, a user needs merely to indicate the IMPU of one of the IGs of the existing PN to the IG to be added; because all of the IGs (and PNASs serving them), including the new IG, automatically update their IGLs such that they include all the IGs including the new IG, the new IG is added to the existing PN.

Accordingly, the workload for forming a single network from a plurality of networks is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A gateway that retrieves a user identity and connects a local network to a service provider network associated with the user identity, the gateway configured to perform operations comprising:
    maintaining gateway information representing a group of gateways that include the gateway and other gateways that retrieve other user identities and connect other local networks to other service provider networks associated with the other user identities;
    subscribing to other gateway information maintained by the other gateways, and subscribes to subscriber information maintained by an application server in the service provider network, wherein the subscriber information represents gateways that are subscribing to the gateway information;
    receiving the other gateway information to which the gateway is subscribed, and receiving the subscriber information to which the gateway is subscribed;
    detecting in the received subscriber information, a new gateway that is not included in the group, prompting a user of the gateway to permit an addition of the new gateway to the group, after detecting the new gateway, and modifying the gateway information such that the new gateway is included in the group in response to an instruction by the user of the gateway to permit the addition of the new gateway to the group;
    replacing content of the gateway information with content of the other gateway information received;
    informing the application server of change in the gateway information;
    maintaining topology information representing a directed graph between the gateways included in the group, wherein the directed graph is configured such that every gateway has a path to every other gateway,
    wherein the gateway does not subscribe to gateway information maintained by a given gateway if the gateway does not have a direct path to the given gateway in the directed graph;
    modifying, when the new gateway is included in the group, the topology information such that every gateway, including the new gateway, has a path to every other gateway, including the new gateway, in the directed graph, and sending the modified topology information to the application server;
    receiving other topology information from the other application servers; and
    replacing the topology information with the other topology information received.

2. The gateway according to claim 1, wherein detecting the gateway does not modify the gateway information if the addition is not permitted.

3. The gateway according to claim 1, further comprising: modifying, in response to an instruction by a user of the gateway, the gateway information such that a new gateway is included in the group.

4. The gateway according to claim 1, wherein the operations comprise:
    subscribing to other network information maintained by the other gateways, wherein the other network information describes the other local networks;
    receiving the other network information to which the gateway is subscribed; and
    sending network information describing the local network and said other network information to the application server.

5. A method for controlling a first gateway that retrieves a first user identity and connects a first local network to a first service provider network associated with the first user identity, the method comprising:
    creating first gateway information representing a group of gateways, wherein the group represented by the created first gateway information only includes said first gateway;
    informing an application server in the first service provider network of addition of the first gateway to the group;
    subscribing to subscriber information maintained by the application server, wherein the subscriber information represents gateways that are subscribing to the first gateway information;
    detecting a second gateway;
    prompting a user of the first gateway to permit an addition of the second gateway to the group, after detecting the second gateway;
    modifying the first gateway information such that the second gateway, which retrieves a second user identity and connects a second local network to a second service provider network associated with the second user identity, is included in the group in response to an instruction of the user of the first gateway to permit the addition of the second gateway to the group;
    informing the application server of the addition of the second gateway to the group;
    subscribing to second gateway information maintained by the second gateway;
    receiving the second gateway information, which represents a group of gateways including a third gateway that retrieves a third user identity and connects a third local network to a third service provider network associated with the third user identity;
    replacing content of the first gateway information with content of said second gateway information;

informing the application server of change in the first gateway information resulting from the replacement;
subscribing to third gateway information maintained by the third gateway;
maintaining topology information representing a directed graph between the gateways included in the group, wherein the directed graph is configured such that every gateway has a path to every other gateway,
wherein the first gateway does not subscribe to gateway information maintained by a given gateway if the first gateway does not have a direct path to the given gateway in the directed graph;
modifying, when the new gateway is included in the group, the topology information such that every gateway, including the new gateway, has a path to every other gateway, including the new gateway, in the directed graph, and sending the modified topology information to the application server;
receiving other topology information from the other application servers; and
replacing the topology information with the other topology information received.

6. The method according to claim 5, further:
receiving topology information representing a directed graph between the gateways included in the group represented by said second gateway information, wherein the directed graph is configured such that every gateway has a path to every other gateway,
wherein, if said first gateway does not have a direct path to said third gateway in the directed graph, the subscription to the third gateway information is not made in subscribing to the third gateway information.

7. The method according to claim 5, further comprising:
sending network information describing the first local network to the application server;
subscribing to second network information maintained by the second gateway, the second network information describing the second local network;
receiving the second network information;
sending the second network information to the application server;
subscribing to third network information maintained by the third gateway, the third network information describing the third local network;
receiving the third network information; and
sending the third network information to the application server.

8. An application server capable of operating in a service provider network associated with a user identity that is retrieved by a gateway connecting a local network to the service provider network, wherein the gateway maintains gateway information representing a group of local network gateways connected to different respective service provider networks, the group including that include the gateway and other gateways that retrieve other user identities and collect other local networks to other service provider networks associated with the other user identities, the application server configured to perform operations comprising:
maintaining the gateway information by receiving notification of change in the gateway information;
accepting, from other application servers in the other service provider networks, subscriptions to the gateway information by use of the other user identities, and accepting, from the gateway, a subscription to subscriber information representing gateways whose user identities are used for subscribing to said gateway information;
notifying the other application servers that are subscribing to the gateway information of the gateway information, and notifying the gateway that is subscribing to the subscriber information of the subscriber information, such that the other application servers and the gateway share the gateway information representing the group of local network gateways connected to different respective service provider networks, wherein the gateway information representing the group of local network gateways connected to different respective service provider networks is shared by the other gateways;
subscribing, by use of the user identity, to other gateway information maintained by the other gateways;
receiving the other gateway information to which the gateway is subscribed;
forwarding the other gateway information received to the gateway;
maintaining topology information representing a directed graph between the gateways included in the group, wherein the directed graph is configured such that every gateway has a path to every other gateway,
wherein the gateway does not subscribe to gateway information maintained by a given gateway if the gateway does not have a direct path to the given gateway in the directed graph;
modifying, when the new gateway is included in the group, the topology information such that every gateway, including the new gateway, has a path to every other gateway, including the new gateway, in the directed graph, and sending the modified topology information to the application server;
receiving other topology information from the other application servers; and
replacing the topology information with the other topology information received.

9. The application server according to claim 8,
wherein the operations comprise maintaining the topology information by receiving it from the gateway, and forwarding the received topology information to the other gateways and other application servers in the other service provider networks.

10. The application server according to claim 8,
wherein subscribing to other network information maintained by the other gateways, wherein the other network information describing the other local networks; and
wherein receiving the other network information to which the gateway is subscribed and receiving from the gateway, network information describing the local network.

11. A method for controlling a first application server capable of operating in a first service provider network associated with a first user identity that is retrieved by a first gateway connecting a first local network to the first service provider network, the method comprising:
receiving notification of addition of the first gateway;
creating first gateway information representing a group of local network gateways connected to different respective service provider networks, wherein the group represented by the created first gateway information only includes said first gateway;
receiving notification of addition of a second gateway, which retrieves second user identity and connects a second local network to a second service provider network associated with the second user identity, to the group;
modifying the first gateway information such that the second gateway is included in the group;
subscribing, by use of said first user identity, to second gateway information maintained by the second gateway;

receiving the second gateway information, which represents a group of gateways including a third gateway that retrieves a third user identity and connects a third local network to a third service provider network associated with the third user identity;

forwarding the second gateway information to the first gateway;

receiving notification of addition of the third gateway to the group;

modifying the first gateway information such that the third gateway is included in the group;

accepting, from a second application server in the second service provider network, a subscription to the first gateway information by use of the second user identity;

notifying the second application server that is subscribing to the first gateway information of the first gateway information, such that the second application server and the first gateway share the first gateway information representing the group of local network gateways connected to different respective service provider networks, wherein the first gateway information representing the group of local network gateways connected to different respective service provider networks is shared by the second and third gateways;

accepting, from a third application server in the third service provider network, a subscription to the first gateway information by use of the third user identity;

notifying the third application server that is subscribing to the first gateway information of the first gateway information, subscribing, by use of said first user identity, to third gateway information maintained by the third gateway;

receiving the third gateway information;

forwarding the third gateway information to the first gateway;

maintaining topology information representing a directed graph between the gateways included in the group, wherein the directed graph is configured such that every gateway has a path to every other gateway, wherein the first gateway does not subscribe to gateway information maintained by a given gateway if the first gateway does not have a direct path to the given gateway in the directed graph;

modifying, when the new gateway is included in the group, the topology information such that every gateway, including the new gateway, has a path to every other gateway, including the new gateway, in the directed graph, and sending the modified topology information to the application server;

receiving other topology information from the other application servers; and replacing the topology information with the other topology information received.

12. The method according to claim 11, further comprising:

receiving topology information representing a directed graph between the gateways included in the group represented by the second gateway information, wherein the directed graph is configured such that every gateway has a path to every other gateway; and wherein, if said first gateway does not have a direct path to the third gateway in the directed graph, the subscription to the third gateway information is not made in subscribing to the third gateway information.

13. The method according to claim 11, further comprising:

receiving, from the first gateway, network information describing the first local network;

subscribing, by use of said first user identity, to second network information maintained by the second gateway, the second network information describing the second local network;

receiving the second network information;

subscribing, by use of said first user identity, to third network information maintained by the third gateway, the third network information describing the third local network; and receiving the third network information.

14. The method of claim 11, wherein the group comprises a group of local network gateways connected to different respective IP-based service provider networks, wherein the first gateway information represents the group of local network gateways connected to different respective IP-based service provider networks, and wherein notifying the second application server comprises:

notifying the second application server that is subscribing to the first gateway information of the first gateway information, such that the second application server and the first gateway share the first gateway information representing the group of local network gateways connected to different respective IP-based service provider networks, wherein the first gateway information representing the group of local network gateways connected to different respective IP-based service provider networks is shared by the second and third gateways.

15. The method of claim 5, wherein modifying the first gateway information comprises:

modifying the first gateway information such that the second gateway is included in the group in response to the instruction of the user of the first gateway to permit the addition of the second gateway to the group, after prompting the user of the first gateway to permit the addition of the second gateway to the group.

16. The gateway of claim 1, wherein every gateway in the group has a path to every other gateway in the group.

* * * * *